United States Patent [19]

Maurer et al.

[11] Patent Number: 5,643,652

[45] Date of Patent: Jul. 1, 1997

[54] COMPOSITE PANEL FOR TOILET AND SHOWER PARTITIONS

[75] Inventors: Ronald L. Maurer, Indianapolis; Daniel P. Carvin, Sheridan, both of Ind.

[73] Assignee: Centura Solid Surfacing, Inc., Indianapolis, Ind.

[21] Appl. No.: 314,343

[22] Filed: Sep. 28, 1994

[51] Int. Cl.$^6$ ..................................................... B32B 3/12
[52] U.S. Cl. ........................... 428/116; 4/596; 428/319.3; 428/921
[58] Field of Search ............................... 428/116, 118, 428/319.3, 921; 4/596

[56] References Cited

U.S. PATENT DOCUMENTS

| | | | |
|---|---|---|---|
| 3,108,367 | 10/1963 | Christman | 428/116 X |
| 3,166,149 | 1/1965 | Hulse et al. | 428/255 X |
| 3,450,593 | 6/1969 | Fossier et al. | 428/73 |
| 3,544,417 | 12/1970 | Corzine | 428/73 X |
| 3,642,550 | 2/1972 | Doll | 428/116 X |
| 3,775,526 | 11/1973 | Gilmore | 428/116 X |
| 3,963,846 | 6/1976 | Bourke | 428/116 X |
| 4,136,222 | 1/1979 | Jonnes | 428/116 |
| 4,305,164 | 12/1981 | Sargent et al. | 4/462 |
| 4,433,021 | 2/1984 | Riel | 428/116 |
| 4,535,514 | 8/1985 | Grabowski et al. | 24/633 |
| 4,844,944 | 7/1989 | Graefe et al. | 428/319.3 X |
| 4,897,971 | 2/1990 | Durston | 428/116 X |
| 5,104,266 | 4/1992 | Daryoush et al. | 405/259.5 |

*Primary Examiner*—Henry F. Epstein
*Attorney, Agent, or Firm*—Brinks Hofer Gilson & Lione

[57] ABSTRACT

A composite panel for toilet and shower partition systems and for other applications. The composite panel comprises a lightweight core sheet of cellular material, first and second sheets of solid surfacing material, and a bonding agent for bonding the first and second sheets of solid surfacing material to opposed surfaces of said core sheet. A composite panel according to the present invention provides the advantageous properties of a solid surfacing material and, at the same time, is relatively light in weight and possesses strong structural integrity.

10 Claims, 2 Drawing Sheets

COMPOSITE PANEL FOR TOILET AND SHOWER PARTITIONS

BACKGROUND OF THE INVENTION

1. Field of the Invention

The present invention relates generally to a composite panel; and, more particularly, to a composite panel for wall partitions, such as shower and toilet partitions, which comprises sheets of solid surfacing material bonded to opposed surfaces of a lightweight, cellular core sheet.

2. Description of the Prior Art

Panels for toilet and shower partitions are manufactured from a variety of materials including steel, plastic, fiberglass and various laminates. Such known panels, however, suffer from various inadequacies and are not fully satisfactory. The wet environment of a bathroom or locker room facility, for example, can cause steel partition panels to rust or panels of laminate materials to delaminate. Panels formed of plastic sheet often scratch relatively easily and may degrade over time due to chemical reaction. Yet other panel materials, such as fiberglass, do not meet fire code for use in toilet partitions.

It is also known to manufacture partition panels of solid surfacing material. Solid surfacing material possesses numerous properties which make it especially suitable for use in shower and toilet partitions including being waterproof and fire-retardant and having cleanability, scratch resistance, long-term wearability and limited maintenance.

Panels formed of solid surfacing material which are currently available include panels formed by a single sheet having a thickness of, for example, ¾-inch; and panels created by permanently bonding together (laminating) two sheets of ½-inch solid surfacing material. Notwithstanding their advantageous properties, however, potential customers of wall partition systems are hesitant to accept panels of solid surfacing material instead of more conventional materials because of their substantial weight. For example, partition panels formed of solid surfacing material can weigh several hundred pounds rendering them difficult to handle and to properly mount. Also, such panels are susceptible to cracking due to impact, and under such circumstances, a panel, particularly a panel formed of a single sheet of solid surfacing material, could shatter and collapse creating a potentially dangerous situation.

SUMMARY OF THE INVENTION

The present invention provides a composite panel for wall partitions and other applications, which is particularly suitable for use in partition systems for showers and toilets, and which provides the advantageous features of a solid surfacing material; while, at the same time, is relatively light in weight and has strong structural integrity.

A composite panel according to the present invention comprises a lightweight core sheet comprising a sheet of cellular material, at least one sheet of solid surfacing material, and a bonding agent for bonding a surface of the at least one sheet of solid surfacing material to a surface of the lightweight core sheet.

When used as a partition panel, the composite panel of the invention comprises a lightweight core sheet having a sheet of solid surfacing material bonded to each of the two opposed surfaces thereof.

A sheet of solid surfacing material incorporated into a composite panel for wall partitions preferably comprises a sheet of either one-quarter inch by 32 inches or one-quarter inch by 36 inches which is cast-molded of engineered polyester resins, filler materials and colorant. Each sheet is cast to the desired thickness to provide proper colorization, densification, wear and maintenance characteristics generally associated with solid surfacing material. Preferably, the solid surfacing material has appropriate filler materials incorporated therein to provide the sheet with a somewhat increased flexibility so as to enhance the final performance of the product and to meet or exceed test standards for impact resistance.

The core sheet comprises a lightweight core of cellular form such as of a ribbed or foamed material. In a presently preferred embodiment, the core sheet comprises a polypropylene honeycomb core, both sides of which are covered with a ten-ounce polyester scrim material to which the sheets of solid surfacing material can be effectively bonded.

The bonding agent preferably comprises a catalyzed polyester resin agent which is applied to the entire surface of the core sheet as by rolling or spraying so as to provide a strong, permanent bond over the entire mating area of the surfaces of the core sheet and the sheet of solid surfacing material. After completion of the bonding process, the assembled unit can be surfaced by an appropriate sander to provide a composite panel having a net thickness of about one inch which is the standard thickness utilized in the toilet partition industry.

The core sheet, the sheets of solid surfacing material and the bonding agent are preferably all formed of polyester-based materials to provide an enhanced bond between the core sheet and the sheets of solid surfacing material, and to generally provide a stronger, more reliable composite panel.

The composite partition panel according to the present invention provides the important advantages of a solid surfacing material panel including repairability, cleanability, being waterproof and fire-retardant and the like. In addition, the composite panel of the present invention is relatively light in weight and, thus, can be more easily handled and mounted. Also, because of the composite construction of the panel, any chipping or cracking of the solid surfacing material sheets due to impact will not result in the panel as a whole shattering or collapsing. This is because the core sheet functions as a backing for the sheets of solid surfacing material bonded thereto and will maintain the integrity of the composite panel as a whole.

Further advantages and specific details of the invention will become apparent hereinafter in conjunction with the following detailed description of a presently preferred embodiment.

DETAILED DESCRIPTION OF THE PREFERRED EMBODIMENT

Figure 1:
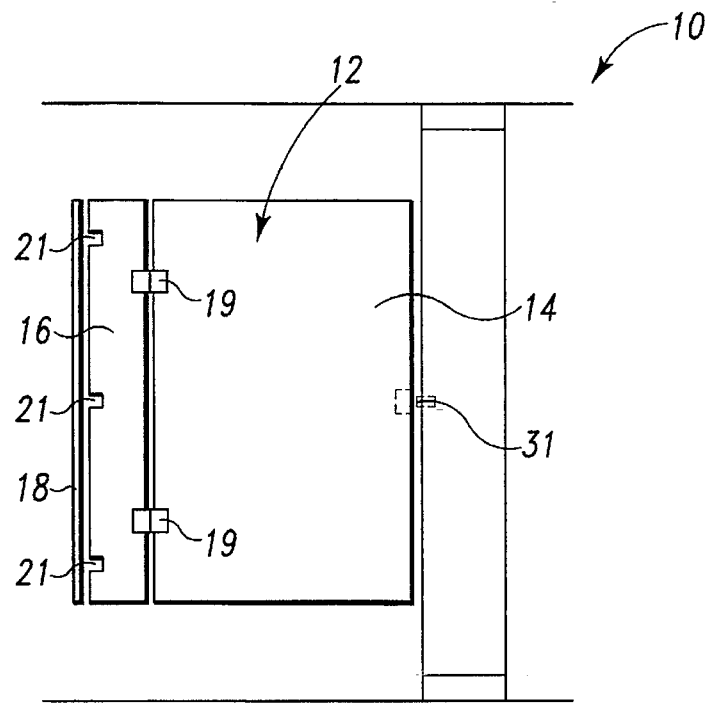
FIGS. 1 and 2 schematically illustrate front and side views, respectively, of exemplary wall partition systems to assist in explaining the present invention.
Figure 2:
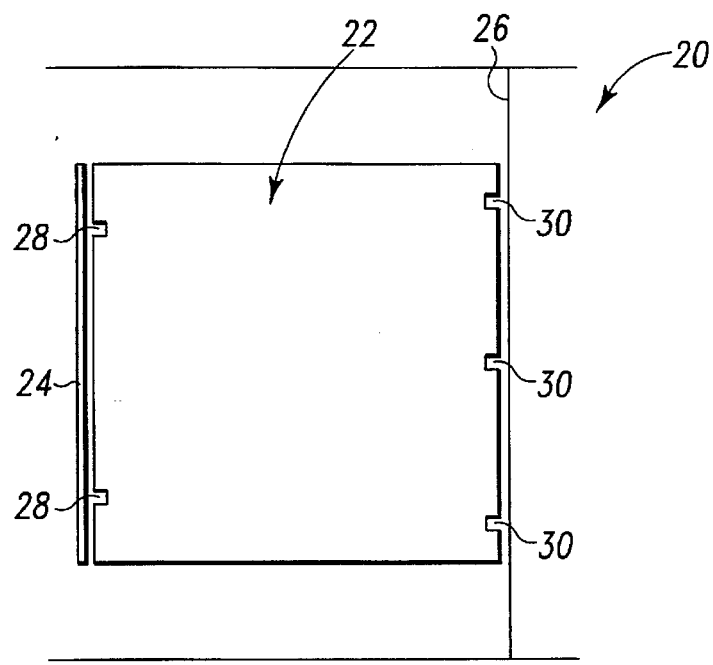

FIGS. 1 and 2 are front and side views, respectively, schematically illustrating exemplary wall partition systems which are generally designated by reference numbers 10 and 20, respectively, in the FIGS. Wall partition systems 10 and 20 are suitable, for example, for defining a toilet or shower compartment in a restroom, locker room or other facility.

FIG. 2 illustrates a side wall panel 22 mounted to a front wall panel 24 and to a wall 26 of the facility by appropriate mounting hardware 28 and 30, respectively. FIG. 1 illustrates a front wall partition 12 composed of a door 14 hingedly mounted to a support panel 16 which, in turn, is mounted to a side wall partition panel 18 by suitable mounting hardware 19 and 21, respectively.

As is known to those skilled in the art, wall partition systems may be designed in numerous ways; and FIGS. 1 and 2 are intended to be exemplary only of suitable designs and are provided merely to assist in explaining the invention. For example, in the systems illustrated in FIGS. 1 and 2, the panels forming each partition are sized to define a space between the partition and the floor and ceiling of the facility. In other designs, the panels may extend to the floor and/or ceiling. Also, as known to those skilled in the art, partition systems can be wall-mounted as shown in FIGS. 1 and 2, floor-supported or hung from the ceiling.

The various partition panels defining a wall partition system can be provided with various fixtures or the like depending on the particular application in which the system is being used. For example, FIG. 1 illustrates a latching mechanism 31 mounted to the door. Fixtures such as toilet paper holders, soap dispensers, etc. may also be mounted to interior walls of the partition panels, as needed.

Wall partition systems for toilets and showers traditionally have comprised panels made, for example, of steel, plastic, fiberglass or various laminates. Such traditional materials, however, all suffer from various inadequacies. For example, steel partition panels tend to rust in the wet environment of a restroom or locker room. Similarly, moisture can also cause panels of laminate materials to delaminate. Partition panels formed of plastic sheet may scratch easily and often deteriorate in appearance over time, and materials such as fiberglass do not meet fire code requirements for use in toilet partitions.

It is also known to form partition panels from sheets of solid surfacing material. For example, partition panels are known which comprise single ¾-inch sheets of solid surfacing material or two ½-inch sheets of solid surfacing material bonded together (laminated) to form one-inch panels. Solid surfacing material provides numerous advantages which are especially beneficial in wall partition systems including high scratch resistance, long-term wearability and limited maintenance, as well as being waterproof and fire-retardant. However, partition panels formed of solid surfacing material are also quite heavy; for example, large panels can weigh 200 pounds or more, and are thus difficult to handle, properly mount and safely support.

Furthermore, solid surfacing material panels are susceptible to cracking due to impact and if they do, they may shatter and fall, creating a potential risk of injury to persons in or near the partition.

According to the present invention, a composite panel for wall partition systems and other applications is provided which generally comprises relatively thin sheets of solid surfacing material bonded to opposed surfaces of a lightweight core sheet to provide a composite panel which provides the advantageous properties of a solid surfacing material and, at the same time, is relatively light in weight and substantially protected from falling or shattering.

Figure 3:
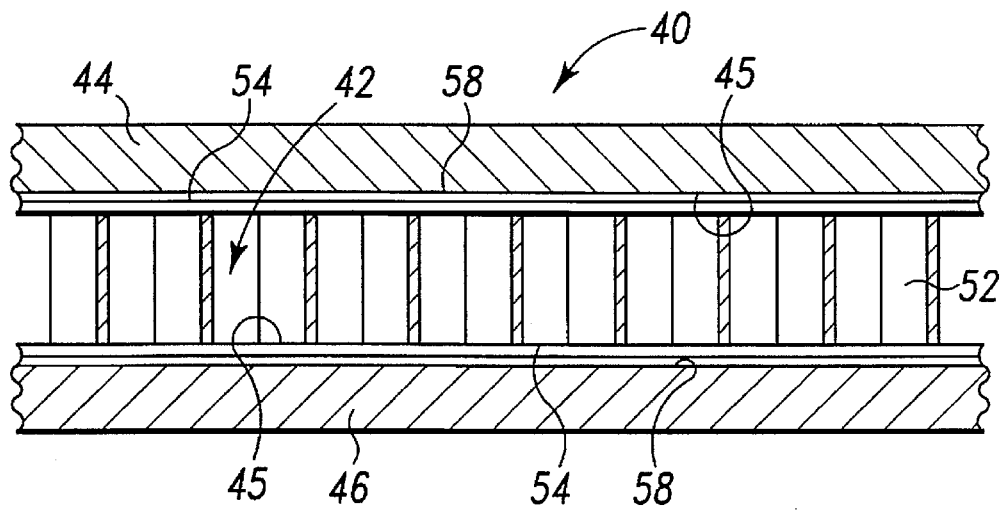
FIG. 3 is a schematic cross-sectional view illustrating a composite panel according to a presently preferred embodiment of the invention for use in wall partition systems such as illustrated in FIGS. 1 and 2.

A composite panel according to a presently preferred embodiment of the invention is schematically illustrated in FIG. 3 and is generally identified by reference number 40. The composite panel comprises a lightweight core panel 42, preferably of a cellular material, to the opposed outer surfaces of which are bonded sheets 44 and 46 of solid surfacing material.

A solid surfacing material is generally recognized in the industry as comprising a product which is cast or extruded, is colored throughout, and is 98 percent de-aired, utilizing a matrix consisting of a resin (for example, polyester, acrylic or a combination thereof) and inert fillers, most commonly aluminum trihydrate (ATH) which functions as an extender for the resin and which renders the resin fire-retardant.

Solid surfacing materials are available in the marketplace from various sources, for example, under the trademark CENTURA available from Centura Solid Surfacing, Inc. of Indianapolis, Ind. and under the trademark CORIAN available from duPont; and, therefore, details of its manufacture need not be recited herein in any substantial detail. In general, however, sheets of solid surfacing material as used in the present invention may be manufactured by mixing an unsaturated polyester resin with aluminum trihydrate of the appropriate particle size. As will be described hereinafter, appropriate additives and colorants are typically also added to the mix to enhance its properties. The mix is then homogenized in a vacuum mixer forcing air from the product (so that the product is 98 percent or better de-aired). After a short mixing cycle, the mix is then transferred into a mold and molded at room temperature; and, when ready, the sheet is demolded and dimensioned by using an appropriate sander, for example, a drum belt sander. The resultant product is highly chemical-resistant, stain-resistant and repairable and can be tooled into many shapes and designs using common woodworking tools. Because it is a fully densified product, it has a non-porous, highly sanitary surface and this property together with its being fire-retardant makes the product particularly suitable for use in partition systems for toilets and showers and the like.

When using the solid surfacing material in a wall partition system, it may be desirable to incorporate various additives and/or filler materials into the formula to enhance its properties for that application. For example, an appropriate colorant is normally added, as indicated above, to provide the partition panels in a desired color. Also, an appropriate agent may be added to increase the flexibility or resiliency of the solid surfacing material sheet somewhat so that the panel can better withstand impacts without cracking. Such an agent may comprise an inhibitor such as a quinone inhibitor, and most preferably toluhydronquinone, which functions to prevent a 100 percent cure of the material and thus renders the material somewhat more resilient. This enhanced resiliency is also preferred to ensure that the partition panels will meet or exceed all test standards for impact resistance.

A sheet of solid surfacing material used in the present invention comprises a molded sheet stock of, preferably, one-quarter inch thickness. Once the sheet is cast and cured, it is dimensionally sanded on the back surface 45 thereof (see FIG. 3) to provide a level and true sheet which can be properly bonded to the core sheet.

Figure 4:
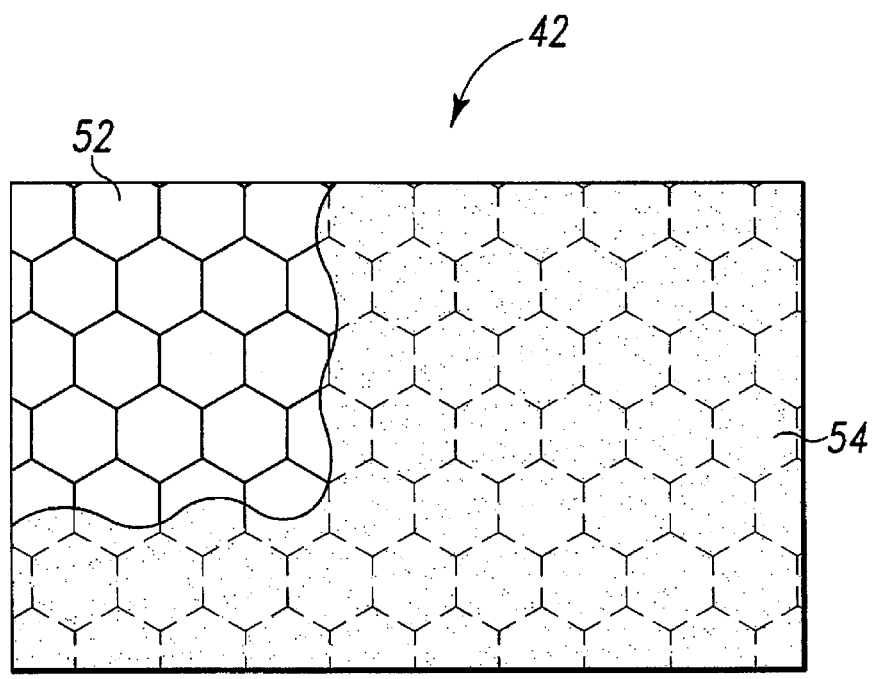
FIG. 4 is a plan view schematically illustrating the core sheet incorporated into the composite panel of FIG. 3.

The core sheet comprises a lightweight core of cellular material, for example, a ribbed or foamed structure, to which sheets of solid surfacing material can be effectively bonded. In the presently preferred embodiment of the invention, and as illustrated in FIGS. 3 and 4, the core sheet 42 comprises a polyproplyene, honeycomb core 52 covered on each side with a ten-ounce polyester scrim material 54 (in FIG. 4, a portion of the scrim material has been removed to better illustrate the honeycomb core). Such a core sheet is marketed under the designation NYDACORE H8PP available from Nida-Core Corporation. Instead of using a polyester scrim material, the honeycomb core can also be covered with eighth-inch Luan plywood, fiberglass or aluminum. The honeycomb core itself preferably has a thickness of about one-half inch.

A sheet of solid surfacing material is bonded to one side of the core sheet by means of a bonding agent 58 provided between the scrim material 54 of the core sheet and the back surface 45 of the sheet of solid surfacing material. The bonding agent preferably comprises a catalyzed, polyester resin bonding agent and, after bonding, the assembled unit is fed through a surfacing sander to fully dimension the system on one side. A second sheet of solid surfacing material is then bonded to the scrim material on the second side of the core sheet and the final component is dimensionally sanded to provide a composite panel having a net thickness of one inch.

The composite panel is preferably one inch thick to comply with toilet partition industry standards and to be able to utilize conventional mounting hardware components and associated installation products, although it should be understood that it is not intended to limit the composite panel of the invention to any particular thickness.

In a preferred embodiment, a finished composite panel is one inch thick by 32 inches wide or one inch thick by 36 inches wide and can be of any desired length. These dimensions allow a licensed fabrication technician to cut the composite panels to a final size. The panels may be incorporated into the walls, doors and other components of a wall partition system.

A composite panel according to the present invention is substantially lighter in weight than panels formed of solid surfacing material as are known in the prior art. For example, a composite panel of the present invention, having a thickness of one inch, will have a weight of approximately 5.5 pounds per square foot compared with a weight of about nine pounds per square foot for a panel formed from a single ¾-inch sheet of solid surfacing material, and a weight of about ten pounds per square foot for a panel composed of two ½-inch sheets laminated together. Accordingly, partition panels according to the present invention are easier to handle and mount than partition panels of the prior art.

An important aspect of the composite panel of the present invention is that all associated components of the panel including the sheets of solid surfacing material, the core sheet, including the scrim material thereon, and the bonding agent, comprise polyester resin-based materials and thus provide all of the advantages and performance characteristics provided by utilizing similar resins, including a more effective bondability of the components and a generally higher quality product.

A further important feature of the composite panel according to the present invention is that, in addition to being relatively light in weight, it is also highly shatter-resistant. This is because the honeycomb core sheet supports the sheets of solid surfacing material and functions as a backing for the sheets of solid surfacing material. Accordingly, even if the solid surfacing material sheets were to crack or break due to impact, the core sheet will maintain the integrity of the overall composite panel, and there will be a significantly reduced likelihood that the panel can shatter or fall as in prior art panels.

In forming the composite panel of the present invention, it is highly preferred that the resin bonding agent be uniformly applied to the entire surface area between the core sheet and the solid surfacing material sheets. This can conveniently be done by rolling or spraying the bonding agent over the entire surface of the scrim material 54 before applying the back surface 45 of the solid surfacing material sheet thereto. By bonding the sheets together over their entire mating surfaces, any chipping or cracking of the solid surfacing material sheets that occurs will not cause other portions of the solid surfacing material sheets to separate from the core sheet and, thus, the integrity of the overall panel will be effectively maintained.

It should also be noted that the composite panels of the present invention can usually be easily repaired if the solid surfacing material sheets should crack or chip. Superficial damage to the surface of a solid surfacing material sheet can usually be repaired by sanding or polishing. Deeper surface damage (e.g., ¼-inch or greater) can be repaired by using a solid surfacing material liquid repair material formulated to match the solid surfacing material sheet.

Although the present invention has been described primarily in connection with a partition for toilets or showers, it should be recognized that the composite panel of the present invention can be used in numerous other applications. For example, a composite panel comprising a quarter-inch sheet of solid surfacing material bonded to one side of a honeycomb core sheet can be used as an alternative to commercial office desktop surfaces. In such an application, it is not necessary to bond a sheet of solid surfacing to the bottom surface of the core sheet.

The composite panel of the present invention can also be used as a wall panel or a tabletop surface, and is particularly suitable for use in the restaurant and/or office equipment industry.

The final assembly of the composite panels in the above applications provide for conventional edge-bonding. Such edges can be capped or built up with decorative trim components. Wall panels can be seamed into completely seamless unitized assemblies to provide a virtually endless wall system. This can be achieved by the use of appropriate seam-fill materials which are also polyester resin-based materials.

Because, as described above, the invention can take numerous forms, it should be recognized that the invention should be limited only insofar as is required by the scope of the following claims.

We claim:

1. A composite panel for a wall partition system for a toilet or shower facility comprising:
   a lightweight core sheet, said lightweight core sheet comprising a sheet having a ribbed structure and including a layer of scrim material covering a surface thereof;
   at least one sheet of solid surfacing material, said at least one sheet of solid surfacing material comprising a material which is cast or extruded, colored throughout and about 98 percent de-aired, and which comprises a resin selected from the group consisting of polyester, acrylic and a combination thereof, and an inert filler which functions as an extender for the resin, and which renders the resin fire-retardant; and
   a bonding agent for bonding a surface of said at least one sheet of solid surfacing material to said lightweight core sheet, wherein said bonding agent bonds substantially the entire area of said surface of said at least one sheet of solid surfacing material to said layer of scrim material such that said lightweight core sheet supports said at least one sheet of solid surfacing material over substantially the entire surface of said at least one sheet of solid surfacing material.

2. The composite panel of claim 1 wherein said at least one sheet of solid surfacing material comprises first and second sheets of solid surfacing material, wherein said layer of scrim material covering a surface of said ribbed structure comprises first and second layers of scrim material respectively covering opposed surfaces of said ribbed structure, and wherein said bonding agent bonds substantially the entire area of a surface of each of said first and second sheets of solid surfacing material to said first and second layers of scrim material, respectively.

3. The composite panel of claim 2 wherein said ribbed structure comprises a honeycomb core structure.

4. The composite panel of claim 2 wherein said core sheet is approximately one-half inch thick and said first and second sheets of solid surfacing material are each approximately one-quarter inch thick to provide a composite panel having a thickness of approximately one inch.

5. The composite panel of claim 1 wherein said at least one sheet of solid surfacing material further includes an additive for increasing the flexibility of said at least one sheet of solid surfacing material.

6. The composite panel of claim 5 wherein said additive comprises a quinone inhibitor.

7. The composite panel of claim 1 wherein said lightweight core sheet, said at least one sheet of solid surfacing material and said bonding agent all comprise polyester resin-based materials.

8. A composite panel for use in a wall partition system for a toilet or shower facility comprising:

a core comprising a sheet having a honeycomb structure, the opposed outer surfaces of which are each covered by a layer of scrim material;

first and second sheets of solid surfacing material bonded to the opposed outer surfaces of said core by a bonding agent provided between substantially the entire surface areas of said layers of scrim material and a surface of each of said first and second sheets of solid surfacing material, said first and second sheets of solid surfacing material each comprising a material which is cast or extruded, colored throughout and about 98 percent de-aired, and which comprises a resin selected from the group consisting of polyester, acrylic and a combination thereof, and an inert filler which functions as an extender for the resin and which renders the resin fire-retardant, to provide a composite panel having the advantageous properties of solid surfacing material with reduced weight and enhanced structural strength.

9. The composite panel of claim 8, wherein said core sheet is approximately one-half-inch thick and said first and second sheets of solid surfacing material are each approximately one-quarter-inch thick to provide a composite panel having a thickness of approximately one inch.

10. A composite panel for use in a wall partition system for a toilet or shower facility comprising:

a lightweight core sheet comprising a sheet of foamed material;

first and second sheets of solid surfacing material bonded to the opposed outer surfaces of said core sheet by a bonding agent provided between substantially the entire opposed surface areas of said sheet of foamed material and a surface of each of said first and second sheets of solid surfacing material, said first and second sheets of solid surfacing material each comprising a material which is cast or extruded, colored throughout and about 98 percent or more de-aired, and which comprises a resin selected from the group consisting of polyester, acrylic and a combination thereof, and a filler which functions as an extender for the resin and which renders the resin fire-retardant, to provide a composite panel having the advantageous properties of solid surfacing material with reduced weight and enhanced structural strength.

* * * * *

UNITED STATES PATENT AND TRADEMARK OFFICE
CERTIFICATE OF CORRECTION

PATENT NO. : 5,643,652
DATED : July 1, 1997
INVENTOR(S) : Maurer, et al.

It is certified that error appears in the above-indentified patent and that said Letters Patent is hereby corrected as shown below:

Col. 4, line 16, change "Ind." to --Indiana--.

Col. 4, line 66, change "polyproplyene" to --polypropylene--.

Col. 8, line 13, change "one-half-inch" to --one-half inch--.

Col. 8, line 15, change "one-quarter-inch" to --one-quarter inch--.

Signed and Sealed this

Eighteenth Day of November 1997

Attest:

BRUCE LEHMAN

*Attesting Officer*          *Commissioner of Patents and Trademarks*